(12) United States Patent
Shahidi et al.

(10) Patent No.: US 9,802,370 B2
(45) Date of Patent: Oct. 31, 2017

(54) CERAMIC TOOLS

(75) Inventors: Ebrahim Ghavam Shahidi, Derby (GB); Thomas Joseph Corden, York (GB); Clive Bennett, Derbyshire (GB)

(73) Assignee: Cytec Industrial Materials (Derby) Limited, Derbyshire (GB)

( * ) Notice: Subject to any disclaimer, the term of this patent is extended or adjusted under 35 U.S.C. 154(b) by 446 days.

(21) Appl. No.: 12/993,268

(22) PCT Filed: May 19, 2009

(86) PCT No.: PCT/GB2009/001237
§ 371 (c)(1),
(2), (4) Date: Jan. 11, 2011

(87) PCT Pub. No.: WO2009/141592
PCT Pub. Date: Nov. 26, 2009

(65) Prior Publication Data
US 2011/0100537 A1    May 5, 2011

(30) Foreign Application Priority Data

May 20, 2008   (GB) .................... 0809158.9
Dec. 24, 2008  (GB) .................... 0823498.1

(51) Int. Cl.
*B29C 70/44*   (2006.01)
*B29C 33/38*   (2006.01)
(Continued)

(52) U.S. Cl.
CPC .......... *B29C 70/44* (2013.01); *B29C 33/3814* (2013.01); *B29C 33/56* (2013.01);
(Continued)

(58) Field of Classification Search
CPC ............................................ B29C 70/44
(Continued)

(56) References Cited

U.S. PATENT DOCUMENTS 2,809,898 A    10/1957  Thiess
4,851,280 A *   7/1989  Gupta .................. 442/292
(Continued)

FOREIGN PATENT DOCUMENTS

DE    247412 A1   8/1987
FR    2846591 A    7/2004
(Continued)

OTHER PUBLICATIONS

International Search Report and Written Opinion of the International Searching Authority dated Jan. 21, 2010 for PCT/GB2009/001237, filed May 19, 2009.
(Continued)

*Primary Examiner* — Larry Thrower
(74) *Attorney, Agent, or Firm* — Thi Dang

(57) ABSTRACT

A tool for use in forming molded articles, comprising a tool body formed of a ceramic material preferably porous with a porosity of between 40% and 60% and in the form of a foam. The tool body is profiled to define the mold surface(s) of the tool. The outer surface of the tool can be sealed with epoxy sealant to provide the mold surface(s) of the tool. An elastomeric layer can be applied to the surface(s) of the tool body and a resinous material, such as a fiber reinforced material, applied to the elastomeric layer, wherein the elastomeric layer inhibits the movement of resin from the resinous layer into the porous ceramic body, and the resinous layer defines the mold surface.

12 Claims, 3 Drawing Sheets

(51) Int. Cl.
*B29C 33/56* (2006.01)
*C04B 35/111* (2006.01)
*C04B 35/18* (2006.01)
*C04B 35/195* (2006.01)

(52) U.S. Cl.
CPC ............ *C04B 35/111* (2013.01); *C04B 35/18* (2013.01); *C04B 35/195* (2013.01); *C04B 2235/604* (2013.01); *C04B 2235/96* (2013.01); *C04B 2235/9607* (2013.01); *Y10T 156/1028* (2015.01)

(58) Field of Classification Search
USPC .......................................................... 425/90
See application file for complete search history.

(56) References Cited

U.S. PATENT DOCUMENTS

| | | | | |
|---|---|---|---|---|
| 5,580,666 | A | * | 12/1996 | Dubensky et al. ........... 428/552 |
| 6,109,332 | A | | 8/2000 | Sachs et al. |
| 6,174,481 | B1 | | 1/2001 | Holowczak et al. |
| 6,210,612 | B1 | * | 4/2001 | Pickrell et al. ................. 264/44 |
| 6,948,695 | B1 | | 9/2005 | Clark |
| 2005/0023727 | A1 | * | 2/2005 | Sampson ...................... 264/257 |
| 2006/0211567 | A1 | | 9/2006 | Kuhn et al. |
| 2006/0255509 | A1 | | 11/2006 | Boschet et al. |
| 2010/0096779 | A1 | * | 4/2010 | Corden et al. ................ 264/338 |

FOREIGN PATENT DOCUMENTS

| | | | |
|---|---|---|---|
| GB | 2346340 | A | 9/2000 |
| JP | 63-194913 | A | 8/1988 |
| JP | 64-49607 | A | 2/1989 |
| JP | 6-184723 | A | 7/1994 |
| JP | 11-19941 | A | 1/1999 |
| WO | 2007/130372 | A2 | 11/2007 |
| WO | 2008/059272 | A2 | 5/2008 |
| WO | WO 2008/056161 | * | 5/2008 |

OTHER PUBLICATIONS

Search and Examination Report dated Nov. 27, 2012 in United Kingdom Patent Application No. GB0908532.5.
Supplemental Notice to Correct Search and Examination Report dated Nov. 27, 2012 in United Kingdom Patent Application No. GB0908532.5.
Examination Report dated Mar. 14, 2012 in United Kingdom Patent Application No. GB0908532.5.
Examination Report dated Aug. 17, 2012 in European Patent Application 09750070.6.

* cited by examiner

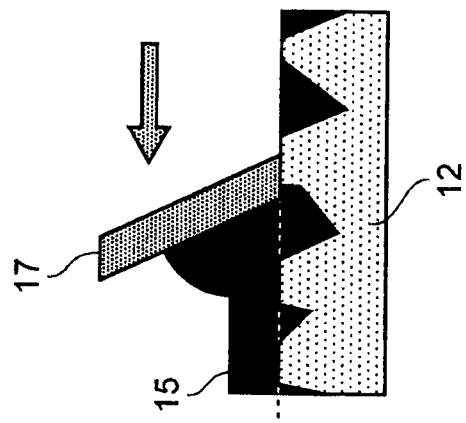
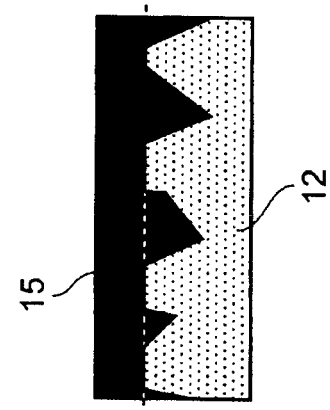
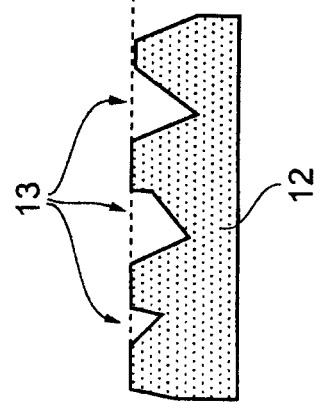

CERAMIC TOOLS

Embodiments of the present invention relate to ceramic tools and particularly, but not exclusively, to ceramic tools for, and methods of, moulding composite materials using ceramic tools.

According to the various, but not necessarily all, embodiments of the present invention there is provided a tool for use in forming moulded articles, the tool comprising a tool body formed of ceramic material. The ceramic material is preferably porous and may comprise a ceramic foam. The ceramic material may have a porosity of 40% to 60%. In various embodiments, the ceramic material may have a porosity of 45% to 55%.

The tool may be for use in forming a moulded article product. In other embodiments, the tool may be a master pattern for use in forming a tool which may be used in forming a moulded article product.

Preferably the ceramic material has a low Coefficient of Thermal Expansion, preferably less than 10 ppm/° C. for use with carbon fibre moulding and desirably less than 5 ppm/° C.

The tool body may comprise one or more of cordierite, alumina silicate and/or derivatives thereof. The tool body may comprise Dylite.

The tool may comprise a resinous material on the tool body and an elastomeric material may be located between said tool body and resinous material to inhibit the movement of resin from the resinous material into the tool body.

Preferably the elastomeric material is located directly between the tool body and resinous material and is in the form of a layer.

Preferably the elastomeric layer is continuous and preferably provides a continuous film between the tool body and the resinous material. Preferably the elastomeric material substantially prevents absorption of resin from the resinous material into the ceramic tool body.

The surface of the ceramic material over which resinous material is laid may be sealed, for example with epoxy sealants. The sealant may inhibit movement of resin into the pores of the ceramic tool body during use.

Preferably the elastomeric material is located on the tool body in a curable condition and is cured on the tool body, preferably in situ between the tool body and the resinous material.

Preferably the resinous material is located on the elastomeric material in a curable condition, and is cured in situ on the tool body. Preferably the elastomeric material inhibits movement of resin from the resinous material when the resinous material is in the curable condition and particularly during cure of the resinous material. The resinous material is preferably in the form of a layer.

The tool body may also include one or more of thermoplastic, glass and carbon.

Preferably the resinous material comprises a fibre reinforced resinous material and may be in the form of a prepreg. The material may be carbon fibre reinforced resinous material. The resinous material may be cured at relatively low temperatures, which may be less than 200° C. (approx.) and desirably between 40 and 200° C.

Alternatively, the resinous material may be cured at relatively high temperatures, such as over 200° C. (approx.), and may comprise one or more of a bismaleimide, cynate ester, polyimide, thermoplastic. The resinous material may be curable at temperatures between 200° C. and 400° C. (approx.).

The resinous material may comprise a blend of resins, some of which may be cured at relatively low temperatures, and some of which may be cured at relatively high temperatures (over 200° C.).

The resinous layer may comprise a laminate structure comprising a plurality of plys. Each ply may comprise a resin impregnated fibrous ply, a resin ply, a dry fibre ply, a prepreg, a syntactic ply, or any other known type of ply used in the formation of composite structures or tool skins. The resinous layer may comprise different plys within the plurality.

The resinous material may provide the surface(s) of the tool on which articles and structures can be formed. One or more of said surface(s) may be finished, such as by machining, sanding or the like.

According to various, but not necessarily all, embodiments of the present invention there is provided a method of manufacturing a tool for use in forming moulded articles, the method comprising forming a tool body of ceramic material.

The ceramic tool body is preferably formed of porous and preferably foamed ceramic. The ceramic tool body may comprise one or more of cordierite, alumina silicate and/or derivatives thereof. The ceramic tool body may comprise Dylite. One or more of the tool body surfaces may be sealed, for example with epoxy sealant. Resinous material may be applied on the tool body to provide moulding surface(s).

An elastomeric material may be applied to be between the tool body and a resinous material to act to inhibit the absorption of resin from the resinous material into the tool body.

Preferably the elastomeric material is applied directly to the tool body, preferably as a continuous layer over a surface and may be applied as a relatively thin film. The elastomeric material is preferably applied in a curable condition and is cured in situ on the tool body.

Preferably the resinous material is applied directly to the elastomeric material such that the layer of elastomeric material is located directly between the tool body and the resinous layer and acts to inhibit the movement of resin from the resinous layer into the interstices of the tool body.

The resinous material may be applied as a layer and may comprise a fibre reinforced resinous material and may be applied in the form of a prepreg. Preferably the resinous material is applied in a curable condition. The resinous layer, may be cured at relatively low temperatures, such as below 200° C. and desirably between 40° C. and 200° C. Alternatively, the resinous layer may be cured at relatively high temperatures, such as above 200° C. The resinous layer may comprise one or more of a bismaleimide, cynate ester, polyimide, thermoplastic. The resinous material may comprise carbon fibres, preferably at least partially impregnated in resin.

Preferably the elastomeric and resinous materials are cured in situ on the tool body. Preferably the elastomeric and resinous materials are cured during a single cure process. This co-cure process not only provides efficiencies, but is also thought to enhance the bond that is exhibited between the body, the elastomeric material and the resinous material.

Preferably the tool body is formed or shaped to be of approximate geometry of the desired tool prior to application of the elastomeric and resinous materials, which may involve shaping of the surface(s) which may be by way of machining, sanding or other known techniques.

The sealed surface(s) and/or the cured resinous material may also be finished on one or more of the outer surface(s)

thereof to provide the moulding surface(s) of the tool. The surface(s) may be finished by machining, sanding or other known techniques.

The resinous material may comprise a laminate of more than one ply, which laminate may comprise any combination of one or more resinous plys, non-resinous plys, prepreg plys, dry fibre plys, syntactic plys and any other plys or layers known in the production of composite articles and tool skins.

According to various, but not necessarily all, embodiments of the present invention there is provided a method of moulding an article on a tool as described above, the method comprising laying material to be moulded on to the tool and subjecting the material to conditions to mould the material thereon.

The material preferably comprises a composites material, such as fibre reinforced resinous composite material. The material may be subjected to conditions of non-atmospheric pressure and/or temperature, such as vacuum conditions, to facilitate moulding.

Various embodiments of the present invention will now be described, by way of example only, with reference to the accompanying drawings, in which:—

FIGS. 2A, 2B and 2C illustrate a diagrammatic cross section view of a tool body according to various embodiments of the present invention receiving a sealant;

Figure 1:
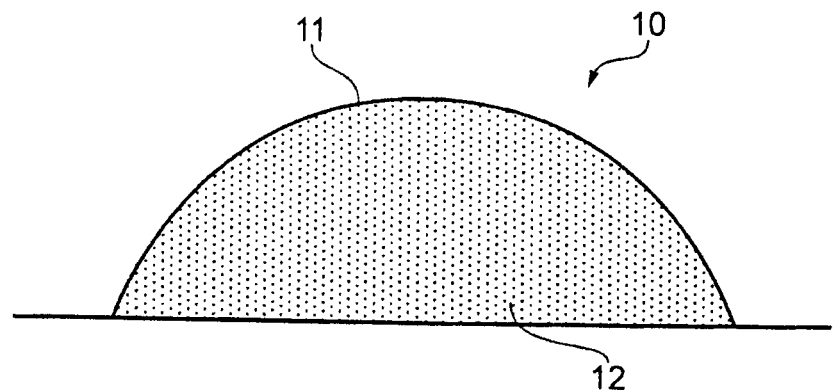
FIG. 1 is a diagrammatic cross-section of a tool according to various embodiments of the present invention.

Embodiments of the present invention provide a tool 10 for use in forming moulded articles, the tool 10 comprising a tool body 12 formed of a ceramic material.

Embodiments of the present invention also provide a method of manufacturing a tool and a method of moulding articles using such a tool.

One particular application of the tools of embodiments of the present invention is in the formation or manufacture of moulded articles formed from curable, resinous composite materials. Such materials have well known advantageous properties, generally being relatively lightweight and of high strength making them useful in the manufacture of articles and components for use in many diverse industries, such as the aeronautical, motor sport, civil engineering and automotive industries, as well as in most areas of sport. Such curable composite materials are well known to those skilled in the art.

The tooling of embodiments of the present invention and the associated methodologies find application for the moulding of many different types of composite materials, including both relatively low temperature cure and high end temperature cure materials. It is perhaps in relation to the latter where embodiments of the present invention find most advantage, as will be described.

In more detail, the tool body 12 comprises porous ceramic material and is preferably of a foamed structure. The ceramic material may have a porosity of 40% to 60%. In various embodiments, the ceramic material may have a porosity of 45% to 55%.

The tool body 12 may be manufactured by blending various ceramic ingredients (e.g. alumina, clay etc.) into powder form. The blended powder may then be loaded into a press tool (the un-compacted powder has a bulk factor of approximately 150%) and approximately 700,000 kgm$^{-2}$ (0.5 ton/sq.in) pressure is applied (e.g. for approximately 10 seconds) to form a pressed body. In other embodiments, approximately 350,000 kg/m$^{-2}$ (0.25 ton/sq.in) is applied to form a pressed body. The pressed body is then heated (e.g. in an oven) to drive off moisture to form the body 12.

One advantage provided by the porous ceramic body 12 is that it has a relatively low thermal mass (when compared to a non-porous body) which may reduce energy costs when the body is heated. Another advantage provided by the porous ceramic body 12 is that it is relatively easy to machine to a desired shape (when compared to a non-porous body).

In various embodiments of the present invention, the tool body 12 comprises one or more of cordierite, alumina silicate and/or derivatives thereof aluminium oxide and may include Dylite (a form of Cordierite), a porous ceramic material which is produced by Dyson Thermal Technologies. Dylite comprises approximately 42% $Al_2O_3$, approximately 49% $SiO_2$, approximately 5.5% MgO and approximately 0.7% $Fe_2O_3$.

Where the body 12 comprises Dylite and is formed using 700,000 kgm$^{-2}$ pressure, the body 12 has an apparent porosity of approximately 50%, a density of approximately 1100 kgm$^{-3}$, a coefficient of thermal expansion of approximately $2.5\times10^{-6}$ K$^{-1}$ and a maximum temperature of use of approximately 1300° C. One advantage provided by using a body 12 which includes Dylite is that it absorbs little to no moisture in a relatively humid environment (e.g. in an environment with a relative humidity of 85%).

Where the tool body 12 comprises Dylite and is formed using 700,000 kgm$^{-2}$ pressure, the tool body 12 may have the following properties:

| Property | Result | | St Dev. | No. Samples | Maximum | Minimum |
|---|---|---|---|---|---|---|
| Cold Crush Strength | 32.9 | MPa | 3.0 | 10 | 36.9 | 27.7 |
| Flex Modulus | 2.8 | GPa | 0.7 | 10 | 4.0 | 1.7 |
| Flex Strength | 5.6 | MPa | 0.7 | 10 | 6.7 | 4.7 |
| Thermal Conductivity | 0.69 | Wm$^{-1}$K$^{-1}$ | — | 4 | 0.75 | 0.65 |
| Specific Heat | 1074 | JKg$^{-1}$K$^{-1}$ | — | — | | |

Where the tool body 12 comprises Dylite and is formed using 350,000 kgm$^{-2}$ pressure, the tool body 12 may have the following properties:

| Property | Result | | St Dev. | No. Samples | Maximum | Minimum |
|---|---|---|---|---|---|---|
| Cold Crush Strength | 20.10 | MPa | 2.57 | 10 | 23.66 | 15.29 |
| Flex Modulus | 2.35 | GPa | 0.7 | 6 | 3.06 | 1.21 |
| Flex Strength | 4.46 | MPa | 0.62 | 7 | 5.5 | 3.9 |

The construction of the foamed body 12 can depend upon the scale of the tool required. The body 12 can be formed from a single block of material, or where large scale tools are required, a number of blocks can be bonded together to form the basic tool structure. For example, the blocks may be bonded together using a cement, a polyvinyl acetate (PVA) adhesive or using a two-pack thermoset adhesive.

The block or structure would then usually be machined or otherwise shaped to the required geometry. For example, the block or structure may be machined using a tungsten carbide tool (or any other suitable tool) at cutter speeds of 15,000 to 22,000 revolutions per minute (rpm) and fed at a rate of up to 1000 mm per minute. The body 12 illustrated in the Figures is, in cross-section, a simple shape for ease of illustration, but it will be appreciated that such foamed bodies can be quite intrically shaped using for example, CNC machinery. Ceramic foam can be very accurately and intricately shaped in this way.

The ceramic material has a low Coefficient of Thermal Expansion of less than 10 ppm/° C. for use with carbon fibre moulding and desirably less than 5 ppm/° C.

The outer surface 11 of the tool body 12 is sealed with epoxy sealant. This sealed surface could provide the mould surface of the tool 10. The sealant acts to prevent resin from material being moulded thereon from migrating into the pores of the ceramic material.

FIGS. 2A, 2B and 2C illustrate how a sealant may be applied to a tool body 12. In FIG. 2A, a tool body 12 is illustrated which comprises a surface with a plurality of pores 13. Next (in FIG. 2B), a sealant (e.g. an epoxy sealant) is provided on the surface of the tool body 12. The sealant may be applied to the surface of the tool body 12 using a brush or by spraying. Then (in FIG. 2C), a screed 17 (e.g. a plastic spreader) is moved across the first surface of the tool body 12 to remove excess sealant 15 from the tool body 12 and to push the sealant into the pores 13.

One advantage of the above method is that it provides an accurate, relatively smooth surface which provides a seal against resin from material being moulded thereon. Additionally, one advantage of using the plastic spreader 17 is that it does little to no damage to the surface of the tool body 12.

Figure 4:
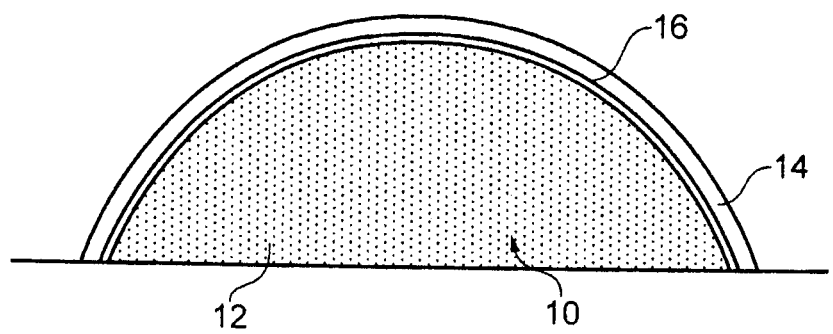
FIG. 4 is a diagrammatic cross-section of a further tool in use in forming a moulded article in accordance with various embodiments of the present invention.

FIG. 4 shows an alternative embodiment wherein the tool 10 has the resinous material 14 located on the body 12, and so when the body 12 is machined to the desired geometry, it is made slightly smaller than the required tool size to allow for the thickness of the resinous layer. The resinous layer provides the tool moulding surface.

In alternative embodiments where further layer(s) are applied over the resinous material wherein the resinous material does not provide the moulding surface of the tool, the body 12 is machined to the appropriate size and shaped to take into account the further layers so that the tool surface is of the desired shape and size.

In a further embodiment elastomeric material 16 is applied to the appropriate surface(s) of body 12. In this embodiment the elastomeric material 16 forms a layer 16 over the body 12.

The elastomeric material comprises a fluoroelastomer, which can be applied to the body 12 in the form of a curable film. It is however within the scope of the present invention that the elastomer is provided in other forms, such as in liquid form and may be sprayed, painted or otherwise applied.

Thickness is generally between 1.5 mm (0.063 in) and 0.76 mm (0.031 in), although this can be adapted to suit.

The resinous material 14 is then laminated directly onto the surface of the elastomer film 16, so that the elastomer film 16 is located directly between the body 12 and the resinous material 14. The elastomer film 16 is substantially impermeable to the resin in the resinous material 14, thus acting to inhibit the transfer of resin into the body 12.

The resinous material 14 may be of any suitable curable material, and is applied as a layer.

One example is a layer or prepreg of epoxy resin matrix material with fibre reinforcements such as carbon or glass fibres, which require relatively low cure temperatures (between 40° C. and 200° C.).

Another example is a bismaleimide matrix with fibre reinforcement, which again in this embodiment is carbon fibre. This requires relatively high cure temperature (200° C.).

It will be appreciated that other curable matrix materials known to the person skilled in the art can be used, such as other low temperature cure resins and other high temperature cure resins like cyanate esters, polyimides and thermoplastics. Blends and mixtures of known materials can be used.

Both the elastomeric film and the resinous layer 14 are cured in situ on the foam body 12. The body 12, elastomer 16 and resinous layer 14 bond together, with little or no migration of resin from the resinous layer 14 into the foam body 12. The elastomer 16 therefore acts to inhibit movement of resin into the foam body 12, both before and during cure.

This has been shown to work with both low temperature cure and high temperature cure resinous layers, and particularly for the latter this is a significant advantage due to the very low viscosities certain such resins, e.g. BMI's exhibit during cure. The elastomer has been shown to bond well between and to both the foam body 12 and the resinous material 14.

The tool of the present application finds particular advantage in that it can be used in the moulding of both low and high temperature cure materials, since the elastomer layer 16, the high temperature cure resinous material and the ceramic body 12 can all withstand high cure temperatures. This enables the tool to be used in the moulding of articles and structures using high temperature cure resin systems.

The elastomer layer 16 also helps prevent brittle fractures propagating between the body 12 and the resinous layer 14. The elastomer provides a compliant layer or interface between the body 12 and the resinous layer 14 which allows for a small degree of movement without damage, such movement being possible as a result of the differences between the coefficient of thermal expansion of the body 12 and layer 14, and also possible tool skin (resinous layer 14) shrinkage.

A further advantage is that the impermeable nature of the elastomer film 16 is such that it addresses difficulties of vacuum integrity during moulding of articles on the tool, as will be explained.

The resinous layer 14 as indicated above, can comprise one or more different types or blends of resinous material, according to the desired application of the tool. The layer 14 could also comprise a laminate, wherein multiple plys are provided within the layer 14. These plys may comprise the same or different material, according to known techniques.

For example, the layer 14 could comprise a single layer of fibre reinforced prepreg wherein the fibrous material is fully, partially, or generally not impregnated into the fibre.

The laminate may comprise one or more resinous plys laminated with one or more dry fibre layers, syntactic layers or any other layers known to those skilled in the art.

Once the resinous material and elastomer have been cured on the tool body 12, the outer surface 18 of the resinous layer 40 on which material is to be loaded for moulding, can be finished to provide the desired geometry and surface finish, such as by way of further machining, sanding or the like.

In other embodiments, the tool body 12 may be sealed with a controlled-flow matrix carbon fibre reinforced plastic (CFRP) skin. The controlled-flow matrix carbon fibre reinforced plastic (CFRP) skin may be a thermoset matrix and may be, for example, an epoxy or bismaleimide matrix. In these embodiments, the resin of the CFRP skin has a relatively low rate of flow and does not substantially migrate into the tool body 12. One advantage provided by these embodiments is that due to the low rate of flow of the resin, an elastomer layer may not be required to seal the tool body 12.

Embodiments of the present invention also provide a method of moulding an article on a tool as described above.

Figure 3:
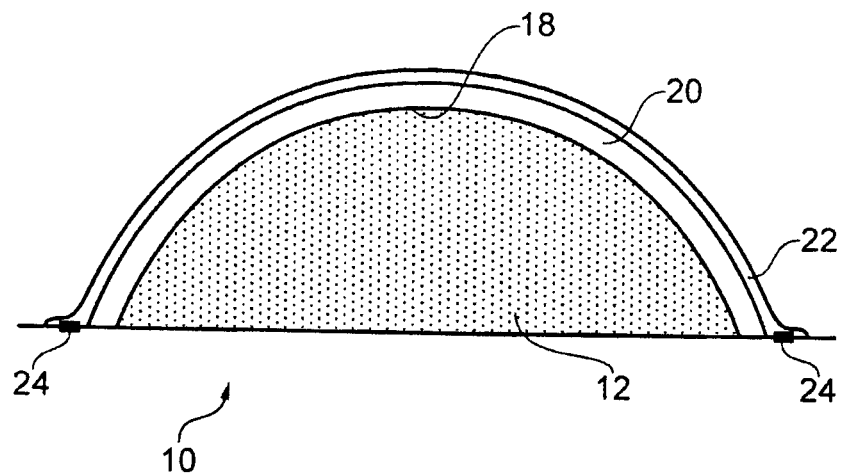
FIG. 3 is a diagrammatic cross-section of the tool of FIG. 1 in use in forming a moulded article in accordance with various embodiments of the present invention.

With reference to FIG. 3, material to be moulded 20 is laid on the surface 18 of the tool 10. The material 20 may be of any known composition and structure, but again a particular advantage of the present invention is that the tool 10 can withstand relatively high temperatures and therefore can be used effectively to manufacture moulded articles from curable resinous materials requiring relatively high cure temperatures.

Once the material 20 has been laid on the surface 18, it is subjected to appropriate conditions to cure the material 20. In FIG. 2, a conventional vacuum bag system is illustrated wherein a vacuum membrane 22 is located around the material 20 and sealed against the body 12 by conventional seal means 24. Details and advantages of the vacuum bagging technique will be known to those skilled in the art.

During cure, air is withdrawn from beneath the sealed membrane 22 to facilitate consolidation and reduce the formation of voids within the material 20, again as will be understood by those skilled in the art.

Importantly, the substantially impermeable nature of the elastomeric layer 16 and/or the sealant on the ceramic body surface is such that it enables the vacuum bag arrangement to be sealed, thus providing vacuum integrity, thus avoiding the difficulties of the inherent porosity of the foamed body 12.

Various embodiments may be made without departing from the spirit or scope of the present invention. For instance the resinous material or layer is described as providing the finished surface on which articles are moulded, but such moulding surface could be provided by another layer, between which and the tool body the said resinous material and elastomer are located.

The elastomeric material may be applied over a plurality of discrete surfaces or surface areas on the tool body, where absorption of resin is to be inhibited.

The elastomeric material may comprise either in addition to that described above, or as an alternative, one or more of low temperature cure silicone elastomers, butyl elastomers and/or polyurethane elastomers.

The resinous material may comprise thermoset and/or thermoplastic resin.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A tool for use in forming moulded articles, the tool comprising:
    a porous tool body having a porosity of 40% to 60% formed of pressed ceramic powder; and
    a fibre-reinforced resinous material on the tool body which provides surface(s) of the tool on which articles can be formed,
    wherein the porous tool body has a Coefficient of Thermal Expansion of less than 10 ppm/° C. and is formed by: blending different ceramic ingredients in powder form; pressing the powder in a press tool at a pressure of approximately 700,000 kg/m$^2$ or approximately 350,000 kg/m$^2$ to form a pressed body; and heating the pressed body to drive off moisture.

2. A tool as claimed in claim 1, in which the porous tool body comprises approximately 42% $Al_2O_3$, approximately 49% $SiO_2$, approximately 5.5% MgO and approximately 0.7% $Fe_2O_3$.

3. A tool as claimed in claim 1, in which the tool comprises an elastomeric material located between said tool body and resinous material to inhibit the movement of resin from the resinous material into the tool body.

4. A tool as claimed in claim 1, in which a surface of the porous tool body over which the resinous material is laid is sealed.

5. A tool as claimed in claim 1, in which the resinous material is curable at temperatures of less than 200° C.

6. A tool as claimed in claim 1, in which the resinous material is curable at temperatures over 200° C.

7. A tool as claimed in claim 1, in which the resinous material comprises one or more of a bismaleimide, cyanate, ester, polyimide, and/or thermoplastic.

8. A tool as claimed in claim 1, in which the resinous material comprises a blend of resins, some of which are cured at temperatures below 200° C., and some of which are cured at temperatures over 200° C.

9. A tool as claimed in claim 1, in which the resinous material comprises a laminate structure comprising a plurality of plies.

10. A tool as claimed in claim 1, wherein the porous tool body is sealed with an epoxy.

11. A tool as claimed in claim 1, the porous tool body having a porosity of 45% to 55%.

12. A tool as claimed in claim 1, wherein the porous tool body has a Cold Crush Strength of from 15.29 MPa to 23.66 MPa when formed using a pressure of 350,000 kg/m$^2$ or the tool body has a Cold Crush Strength of from 27.7 MPa to 36.9 MPa when formed using a pressure of 700,000 kg/m$^2$.

* * * * *